United States Patent [19]
Moyer et al.

[11] Patent Number: 5,194,154
[45] Date of Patent: Mar. 16, 1993

[54] STRUCTURE FOR FILTER OR HEAT EXCHANGER, COMPOSED OF A FUSED SINGLE CRYSTAL ACICULAR CERAMIC

[75] Inventors: John R. Moyer; Neal N. Hughes, both of Midland, Mich.

[73] Assignee: The Dow Chemical Company, Midland, Mich.

[21] Appl. No.: 803,296

[22] Filed: Dec. 5, 1991

[51] Int. Cl.$^5$ .............................................. B01D 29/00
[52] U.S. Cl. ..................... 210/510.1; 55/523; 55/DIG. 10; 55/DIG. 30
[58] Field of Search ............ 55/DIG. 10, DIG. 30, 55/523; 501/5, 6, 151; 210/510.1

[56] References Cited

U.S. PATENT DOCUMENTS

| | | |
|---|---|---|
| 4,041,592 | 8/1977 | Kelm . |
| 4,364,760 | 12/1982 | Higuchi et al. . |
| 4,559,193 | 12/1985 | Ogawa et al. . |
| 4,818,317 | 4/1989 | Otaka et al. . |
| 4,846,906 | 6/1989 | Helferich et al. . |
| 4,894,160 | 1/1990 | Abe et al. . |
| 4,910,172 | 3/1990 | Talmy et al. . |
| 5,098,455 | 3/1992 | Doty et al. ............... 55/DIG. 10 |

FOREIGN PATENT DOCUMENTS 0042301 12/1981 European Pat. Off. .

*Primary Examiner*—Frank Sever

[57] ABSTRACT

A cross-flow structure useful for filtering a fluid, for exchanging one or more constituents between two fluids, or for exchanging heat between two fluids, includes a body having porous partition walls defining at least one open channel extending entirely through it, and a portion of collecting fluid exiting the body through the porous partition walls, rather than through the open channel(s). The body is composed of a fused, interlocked, single crystal acicular ceramic material, preferably a non-stoichiometric acicular mullite of about 76 percent by weight $Al_2O_3$ and about 24 percent by weight $SiO_2$. The portion for collecting fluid exiting from the porous walls is preferably an impermeable coating, such as a glaze, substantially covering the exterior of the body, except for the areas where fluid enters the open channel(s) and exits the porous walls.

15 Claims, 2 Drawing Sheets

STRUCTURE FOR FILTER OR HEAT EXCHANGER, COMPOSED OF A FUSED SINGLE CRYSTAL ACICULAR CERAMIC

TECHNICAL FIELD

This invention relates generally to a ceramic structure for filtering or heat exchange of fluids, either liquids or gases.

BACKGROUND OF THE INVENTION

Ceramic media are commonly used in a wide range of fluid handling procedures, including filtration, diffusion, recovery, transfer, mixing and foaming. Ceramic media are also employed as catalysts, or as carriers for catalysts. Ceramics are well known to possess several advantages as media for fluid handling over alternatives such as organic or metallic filter media. For example, ceramics generally possess superior resistance to deterioration from heat or chemical exposure, in comparison to other media.

Ceramic media are most often used in the form of an aggregation of ceramic particles, either loose or bound to one another. The ceramic particles can be formed as spheres, platelets or needles. The particles are routinely obtained by crushing and classifying (that is, sorting by size) a previously manufactured mass of a desired material. This method of manufacture is subject to some drawbacks, however. Crushing of a formed material can often degrade some of the desirable structural characteristics enjoyed by the material, such as its impact strength, mechanical strength, rigidity, porosity or aspect ratio. (With respect to materials such as platelets or needles, a lower aspect ratio indicates either a shorter or a thicker needle. Thinner needles yield filters with smaller pore sizes.) Moreover, with materials such as platelets or needles, the separately formed platelets or needles are often very delicate and interwoven when manufactured, and consequently fracture upon attempts to separate and classify them.

Even presuming that such particles can be successfully separated, aggregation of the particles may require sintering or the use of a bonding agent, in order to give rigidity, impact strength or mechanical strength. Alternatively, the particles may be aggregated by placing them in a metal container. However, such containers can be expensive, and may not be completely resistant to the gas or liquid being treated. Moreover, it can be difficult to achieve a good seal between the metal container and the particles; if a good seal is not obtained, the fluid may leak around and bypass the particles.

Ceramic media have also been used as supports for porous discriminating layers such as fluorocarbon polymers or sintered ceramic membranes. These supports have typically been made from previously fired spherical particles of alpha-alumina or cordierite. The particles are then lightly sintered to bond them together and give them mechanical strength. Unfortunately, the resulting supports may not possess all the strength that might be desired, particularly against impact, or against the pressure of the fluid flowing through them. The resulting supports have also not been very porous, usually only about 30 percent porous (or 70 percent of theoretical density, defined as 100 percent minus the volume percent porosity).

Many solutions to these problems have been suggested. Each entails its own drawbacks, however. For example, published Japanese Patent application JP 63-103877A (Nagasaki Ken, published May 9, 1988) discloses a process for preparing a porous ceramic compact useful for industrial filtering, for foam generating, as a bioreactor carrier, or for catalysis. The compact is described as having fine porous structure with a relatively high deflection strength. The compact consists of acicular mullite crystals formed from the compression molding and sintering of stoichiometric mullite (3 Al$_2$O$_3$·SiO$_2$). The starting material includes additives so as to allow transfer of any unreacted or any excess silica into a glass phase, which is then eluted with an acid. Although not specifically stated in this reference, hydrofluoric acid has typically been employed for this purpose.

U.S. Pat. No. 3,993,449 (Howard Jacobson et et al., Nov. 23, 1976) discloses a process for preparing single crystal mullite fibrils useful as fillers, catalysts, or catalyst supports. The fibrils are made from aluminum sulfate, a silica source and an alkali metal salt (fluxing agent). The molar ratio of aluminum to silicon in the reactants is from 2.6:2 to 6:2, expressed as Al$_2$O$_3$/SiO$_2$, with at least one alkali metal atom for each aluminum atom. The reference states that although a product that is predominantly "true" (3/2 or stoichiometric) mullite can be obtained from reactants throughout that range, it is preferred to maintain the ratio in the range 2.8 to 3.4:2, so as to avoid the quantity of alpha-alumina platelets which are obtained if there is a large excess of alumina in the reactant mixture.

While both of these disclosures suggest that a fibrous mullite body or support can be obtained that is relatively strong, the degree to which the whiskers forming the bodies bind to each other is not clear. Moreover, control of pore size in such bodies is not as great as could be desired, because the average pore sizes are typically quite small. The bodies are often not useful for applications requiring higher porosities, for example, from 50 up to 85 percent. The use of hydrogen fluoride to elute the glass phase is itself inconvenient because of the risks involved in handling hydrofluoric acid. Additionally, devices constructed from metal generally cannot be used in processes employing hydrofluoric acid as an elution agent.

These problems are especially acute in methods which entail the use of cross-flow structures, for example, cross-flow filtration or heat exchanging. Ceramic cross-flow filters or heat exchangers typically have very low flow rates through them, because of the small pore size and low porosity of their supports. Indeed, even when permeable membranes of very fine pore size are applied to ceramic supports, it is still the rate of flow through the ceramic supports which is the rate-determining factor for the desired filtration or heat exchange.

U.S. Pat. No. 4,894,160 (Fumio Abe et al., Jan. 16, 1990) attempts to address these problems by providing a honeycomb structure for fluid filtration which comprises a porous ceramic support having a multiplicity of parallel passageways formed through it by uniformly spaced porous partition walls, permitting pressurized fluid to flow through the support. A selective membrane is coated onto the surface of the passageways to separate one or more components from the fluid. The filtrate is carried through the partition walls to the exterior surface of the partition walls for collection. The porous partition walls are formed so as to permit the passage of filtrate at a flow quantity more than 20 times the flow quantity of filtrate passing through the selective membrane and partition walls. The selective membrane has an average pore size of about 10 to 10,000 angstroms (about 1 to 1,000 nanometers). The device is useful for microfiltration or ultrafiltration, or for gas separation on the basis of gas diffusion or capillary condensation.

In the preferred embodiment of the device of the reference, the honeycomb support element is contained within a cylindrical casing and held in place by a pair of support plates near the ends of the ceramic support element. The cylindrical casing includes a discharge port for collection of filtrate exiting the partition walls. The external surface of the partition walls between the support plates is coated with a glaze, to direct the flow of filtrate into the discharge port.

While useful for its intended purpose, the device shown by the reference would appear to be subject to several drawbacks during use. The joints between the honeycomb structure and the support plates, or between the support plates and the cylindrical housing, may be subject to leakage, especially during repeated thermal cycling. Moreover, the honeycomb support is disclosed as being constructed of alpha-alumina and kaolin, necessarily sharing the drawbacks of the prior ceramic supports. The ceramic support has a pore volume of about 0.07 to 0.25 cubic centimeters per gram, or a porosity of merely 7 to 25 percent. This low porosity places an upper limit on the pore size of the selective membrane disposed on the porous partition walls. The device is thus plainly subject to the prior drawbacks encountered by supports composed of conventional ceramics or made from a plurality of different components of different materials.

It is therefore an object of the present invention to provide a ceramic filter structure with a discriminating layer thereon, where the filtering medium has been grown in situ to form a network of interlocked needles or platelets which has high mechanical strength, high impact strength, heat resistance and good resistance to thermal cycling.

It is a further object of the present invention to provide a support for a ceramic or other filter membrane having high porosity, yet with superior bonding of the material making up the support for the filter.

It is yet another object of the present invention to provide a method for manufacturing such a filter including a ceramic support which does not entail the dangers associated with the prior use of hydrogen fluoride or other acid for eluting a glass phase from the support.

It is a further object of the present invention to provide a method of interlocking two or more pieces into a ceramic body having a uniform composition and structure, including throughout the locations at which the pieces are joined.

It is also an object of the present invention to eliminate the need for elements of disparate composition, and the need for any means to connect such elements, in a ceramic structure for filtration, heat exchange, or the like.

SUMMARY OF THE INVENTION

In accordance with the preferred embodiment of the invention, these and other objects and advantages are addressed as follows.

Applicants have discovered that the use of certain ceramics in structures useful for filters, supports, heat exchangers and the like achieves significant advantages over ceramics used previously. The particular ceramics useful in the practice of the present invention are fused, interlocked, single crystal, acicular ceramics, such as whiskers of non-stoichiometric mullite having the approximate formula $2Al_2O_3 \cdot SiO_2$. These particular ceramics yield structures having substantially improved mechanical and impact strength, improved resistance to high temperatures, much larger pore sizes, greater porosities, and less sagging during high temperature use, than prior structures made from other ceramics.

Applicants have also discovered that it is significantly easier to construct structures of complex shape from these particular ceramics, in contrast to the mixture of different pieces and different compositions required in making prior filters. More particularly, because the desired ceramics interlock during their formation, abutted pieces composed of these ceramics will also interlock during formation, without the need for any separate means for joining them. (A paste of the ceramic is often useful to aid such interlocking.) Indeed, in many cases a filter or other device incorporating the ceramic structure of the present invention can be constructed entirely from ceramic materials, without the need for any metal or plastic parts, obviating the problems of leakage or fracture at the joints between such parts.

Thus, in a first aspect, the present invention is directed to a structure for filtering a fluid or for exchanging heat or a constituent or contaminant between two fluids, comprising a body composed of a fused, interlocked, single crystal acicular ceramic material, the body having porous partition walls defining at least one open channel extending entirely through the body; and means for collecting fluid exiting the body through the partition walls. Any fluid not passing through the porous partition walls exits the body unhindered, through the open channel or channels. The means for collecting fluid exiting through the partition walls can include an impermeable coating, such as a glaze, substantially covering the exterior of the body of the present invention so as to define an exit for the exiting fluid.

The structure of the present invention can further comprise a membrane on the partition walls, lining the open channels. The membrane can be a porous discriminating layer of sintered ceramic, a polymeric organic compound, a molecular sieve, a gel filtration, gel, or a microporous gaseous diffusion barrier. This makes the structure useful for cross-flow filtration. Alternatively, the membrane can be impermeable, preventing the mixing of a first fluid passing through the channels and a second fluid passing through the partition walls. This makes the structure useful for heat exchange between the fluids.

Other elements may be added to make the structure useful for a variety of purposes. For example, the structure can include a pair of porous end caps composed of the acicular ceramic material, abutting and interlocked with the partition walls. The end caps preferably each include a hole therethrough in fluid communication with the open channels. The end caps also preferably include recesses in them extending only partway through them, opposite the partition walls. Thus, the holes provide an entrance and exit for a fluid to pass through the open channels, while the recesses provide for either the exit, or the entrance and exit, of fluid passing through the porous partition walls. Conveniently, the collecting means can then include a pair of connecting tubes received in the end cap recesses to direct the flow of filtrate exiting the porous walls and end caps. Another pair of connecting tubes can be received in the end cap holes to direct the flow of fluid into and out of the open channels in the ceramic body.

In a second aspect, the present invention is directed to a filter for filtering a fluid, comprising a body composed of a fused, interlocked, single crystal, non-stoichiometric acicular mullite, having (a) a honeycomb extrusion of porous partition walls defining a plurality of open parallel channels fluidly communicating with one another, and (b) a pair of porous end caps abutting the partition walls, each of the end caps having a hole therethrough in fluid communication with the channels, and a recess extending only partway therethrough, opposite the partition walls; a pair of first connecting tubes received in said holes in said end caps, in fluid communication with the channels so as to allow the flow of fluid from one of the first connecting tubes to the other of the first connecting tubes through the open channels; a pair of second connecting tubes received in the recesses in the end caps; and an impermeable glaze substantially covering the exterior of the body, collecting filtrate exiting the body through the partition walls and permitting the filtrate at least to pass through one of the second connecting tubes.

In a third aspect, the present invention is directed to a cross-flow filter for filtering a fluid, comprising a body composed of a fused, interlocked, single crystal, non-stoichiometric acicular mullite, having (a) a honeycomb extrusion of porous partition walls defining a plurality of open parallel channels fluidly communicating with one another, and (b) a pair of porous end caps abutting the partition walls, each of the porous end caps having a hole therethrough in fluid communication with the channels, and a recess extending only partway therethrough, opposite the partition walls; a filter membrane of sintered alpha-alumina on the porous partition walls; a pair of first connecting tubes received in the holes in the end caps, in fluid communication with the open channels so as to allow the flow of fluid from one of the first connecting tubes to the other of the first connecting tubes through the open channels; a pair of second connecting tubes received in the recesses in the end caps; and an impermeable glaze substantially covering the exterior of the body, collecting filtrate passing through the membrane and exiting the body through the partition walls, permitting the filtrate to pass through one of the second connecting tubes. A second fluid may simultaneously enter the other of the second connecting tubes, enter the partition walls and mix with the filtrate, and exit the partition walls and body with the filtrate.

In a final aspect, the present invention is directed to a heat exchanger for use with first and second fluids, comprising a body composed of a fused, interlocked, single crystal, non-stoichiometric acicular mullite, having (a) a honeycomb extrusion of porous partition walls defining a plurality of open parallel channels fluidly communicating with one another, and (b) a pair of porous end caps abutting the partition walls, each of the end caps having a hole therethrough in fluid communication with the open channels, and a recess extending only partway therethrough, opposite the partition walls; an impermeable ceramic membrane on the porous partition walls; a pair of first connecting tubes received in the holes in the end caps, in fluid communication with the channels so as to allow the flow of the first fluid from one of the first connecting tubes to the other of the first connecting tubes through the open channels; a pair of second connecting tubes received in the recesses in the end caps; and an impermeable glaze substantially covering the exterior of the body, so as to allow the flow of the second fluid from one of the second connecting tubes to the other of the second connecting tubes, through the porous partition walls and the porous end caps.

Of course, in all of these aspects, the present invention is useful with either a gas or a liquid as either or both of the fluids, or as the filtrate.

BRIEF DESCRIPTION OF THE DRAWINGS

The nature and extent of the present invention will be clear from the following detailed description of the particular embodiments thereof, taken in conjunction with the appendant drawings, in which.

DETAILED DESCRIPTION OF THE INVENTION

The variety of filtering and exchange devices in which the present invention is useful can most easily be appreciated by initial reference to only a single device, for example, a cross-flow filter 10 useful for exchanging one or more constituents between two fluid flows, the flows preferably being parallel but oppositely directed. Other uses of the present invention will be described below, after the elements and method of manufacture of the filter 10 are explained.

Figure 1:
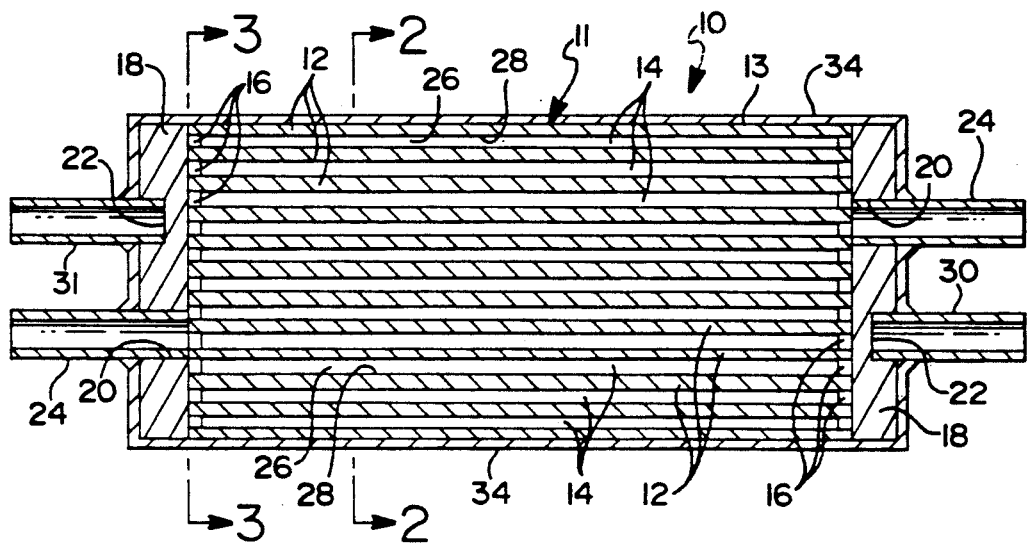
FIG. 1 is a cross-sectional view of a cross-flow filter incorporating the structure of the present invention.

Referring then to FIG. 1, the cross-flow filter 10 first comprises a body 11 composed of a fused single crystal acicular ceramic of interlocked needles, whiskers or platelets (collectively, "whiskers" or "acicular particles"). The body 11 is distinguished from prior ceramic bodies in that the ceramic of which it is composed includes individual acicular particles which are not merely interwoven or superficially sintered as in prior supports, but which are instead constituted as single crystals which are rigidly interlocked at the locations where they cross, by fusion during their formation process. As described in more detail below, the conversion of the ceramic into fused and interlocked acicular particles occurs in situ, and it is the fusion and interlocking of the whiskers which yields a body possessing significantly improved structural strength and resistance to high temperatures, in contrast to prior bodies constructed from previously formed whiskers which have been separated, classified and lightly resintered, with or without a binding agent.

The body 11 is preferably composed of a non-stoichiometric acicular mullite including about 76 percent by weight alumina and 24 percent by weight silica. However, other equivalent materials which are similarly capable of forming fused, interlocking, single crystal, acicular structures upon in situ formation are also useful in the present invention, so long as the acicular particles so formed simultaneously interlock and fuse during formation. Equivalent materials are believed to include aluminum borate whiskers, alumina whiskers and alpha-alumina platelets, or other materials sharing these characteristics.

The physical configuration of body 11 should be chosen in view of the desired function of the device incorporating the body 11. Any of a variety of conventional shapes can be employed. The body 11 can be composed as a single piece, or can be composed as a plurality of pieces having a uniform composition, including through the locations at which the pieces join each other. It is one of the advantages of the present invention that such pieces will interlock during the in situ conversion of the ceramic to the preferred single crystal acicular form.

Figure 2:
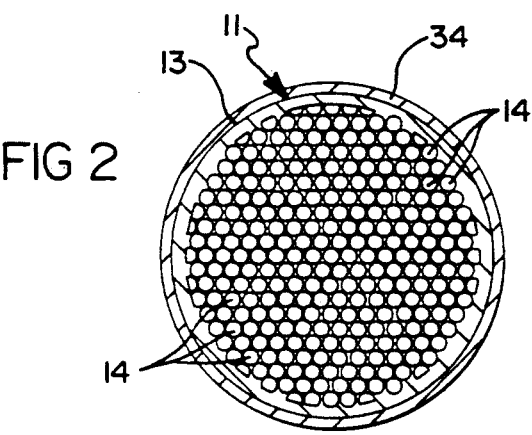
FIG. 2 is a cross-sectional view taken along line 2—2 in FIG. 1.

Conveniently, the body 11 is configured as a honeycomb extrusion 13 having a number of continuously formed partition walls 12 defining a plurality of parallel open channels 14 extending entirely through the body 11. The open channels 14 define a path for the flow of a first one of the two fluids through the body 11. As shown in FIG. 2, the open channels 14 are preferably circular in cross section, although they may have any convenient or desired cross-sectional shape.

Figure 3:
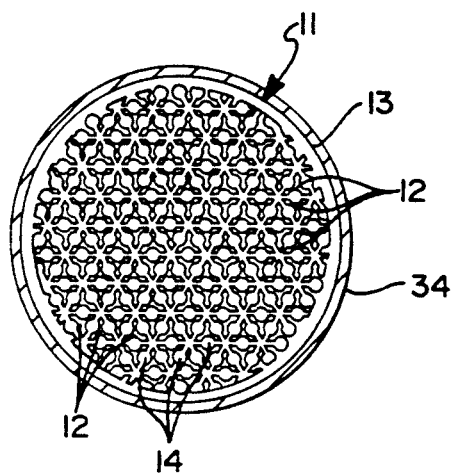
FIG. 3 is a cross-sectional view taken along line 3—3 in FIG. 1.
Figure 4:
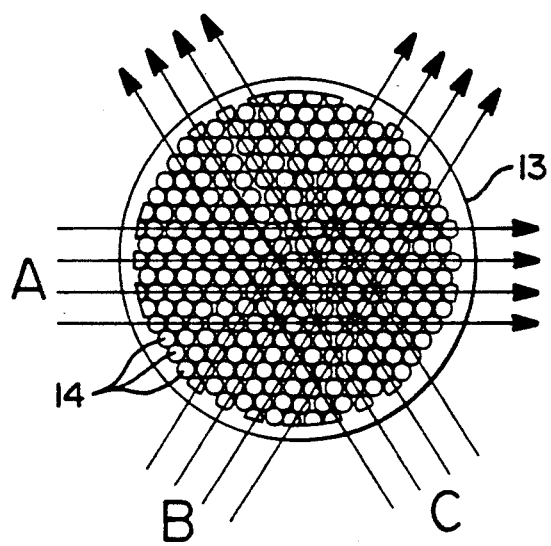
FIG. 4 is an end view of a ceramic support used in making the cross-flow filter shown in FIG. 1 disclosing how the end of the support is cut so as to yield the structure shown in FIG. 3.

It is preferred that the open channels 14 all fluidly communicate with one another. Although the open channels 14 can be placed in fluid communication in a variety of ways (for example, by positioning a hollow dome over each end of the extrusion, to which all of the channels are open), the most convenient way to place the open channels 14 into fluid communication is to form a plurality of transverse clear openings 16 through the partition walls 12. Preferably, the openings 16 are positioned at the opposing ends of the open channels 16 and are formed by saw cuts extending fully across the ends of the extrusion 13, intersecting the open channels 14. More particularly, as shown in FIG. 4, when the open channels 14 are arranged in a closest-packed (hexagonal) fashion, the saw cuts are made along every other row of the open channels 14 in each of the three directions in which the rows run. The arrows A, B, and C exemplify these cuts. FIG. 3 discloses how the end of the extrusion looks after the cuts are made.

The cuts can be made in any convenient fashion. However, it is typically easiest to make the cuts before the honeycomb extrusion 13 is converted into the preferred single crystal acicular ceramic. One way to make the cuts is to draw a thread, wetted with water, across the ends of the extrusion 13 longitudinally in the directions of the arrows A, B, and C.

Referring again to FIG. 1, the body 11 further comprises a pair of porous end caps 18 on the ends of the extrusion 13, abutting the porous partition walls 12. Each of the end caps 18 includes a hole 20 extending fully through the end cap 18, in fluid communication with the channels 12. Each of the end caps 18 also includes a recess 22 extending only partway through the end cap 18, located opposite the partition walls 12. ("Opposite" merely means that the recesses 22 do not communicate with the open channels 14 directly.) The end caps 18 are preferably composed of the same single crystal acicular mullite as the partition walls 12 and are interlocked with them.

A first connecting tube 24 is received in each of the end cap holes 20. The first connecting tubes 24 fluidly communicate with all of the open channels 14 and thereby define a means for directing the flow of the first fluid from one of the first tubes 24, into and through the open channels 14, out of the open channels 14, and through the other of the first tubes 24. The first connecting tubes 24 can be made of a ceramic and may be co-fired with the conversion of the body 11 to the preferred single crystal acicular ceramic. However, the fist connecting tubes 24 are preferably made of or coated with a material which is impermeable to the fluids being handled, so that mixing of the fluids is avoided.

A pair of second connecting tubes 30 and 31 are received in the end cap recesses 22, having their ends in abutment with the porous body 11. The second connecting tubes 30 and 31 are preferably made of or coated with a material which is impermeable to the fluids being handled, and can be made of any of the materials from which the first connecting tubes 24 are made.

An impermeable coating 34 substantially covers the exterior of the body 11, except for the holes 20, the recesses 22, and the open ends of the connecting tubes 24, 30 and 31. The coating 34 may extend partway along the connecting tubes 24, 30 and 31 in order to assure a good seal to the body 11. The coating 34, preferably together with either of the second connecting tubes 30 or 31, defines a means for collecting fluid exiting the body 11 through the partition walls 12. (This exiting fluid can be the second fluid supplied to the filter 10, or a filtrate derived from the first fluid, or a combination of them.) Similarly, the coating 34 and both of the second connecting tubes 30 and 31, together with the end caps 18, define a means for directing the flow of the second fluid into, through, and out of the partition walls 12.

The exiting fluid collecting means (defined by the coating 34, preferably together with either of the second connecting tubes 30 or 31) is formed integrally with the body 11; that is, the exiting fluid collecting means and the body 11 constitute a single piece. This does not mean that the exiting fluid collecting means and the body 11 are composed of the same material; to the contrary, the body 11 is porous, while the exiting fluid collecting means is impermeable. The integral formation of the collecting means and the body 11 is most conveniently carried out by making the coating 34 an impermeable glaze fired on the exterior of the body 11, as described in further detail below.

The surfaces of the porous partition walls 12 that define the open channels 14, as well as any surfaces of the end caps 18 exposed to the first fluid flowing through the open channels 14, are coated with a membrane 26 so as to line the channels 14. In the cross-flow filter 10 the membrane 26 is a porous discriminating layer 28, capable of allowing the exchange of one or more contaminants or constituents between the fluids being handled. The discriminating layer 28 is preferably a sintered alpha-alumina membrane, but can be any conventional layer suitable for filtration, microfiltration, ultrafiltration (for example, for sterilization, for purification of crystals, or the like), reverse osmosis (for example, for the desalination of sea water), or gas separation.

Classes of materials useful for the discriminating layer 28 include sintered ceramics (of which the alpha-alumina membrane is an example), polymeric organic compounds, molecular sieves, gels, and microporous or ultraporous gaseous diffusion barriers. "Molecular sieves" include both the zeolites and the crystalline aluminophosphates derived from mixtures containing an organic amine or a quaternary ammonium salt. "Gels" are simply those gels (such as dextran gels) which are useful in gel filtration. "Polymeric organic compounds" include hydrocarbon, halogenated hydrocarbon, fluorocarbon, and chlorofluorocarbon resins and polymers, such as polytetrafluoroethylene (PTFE), tetrafluoroethylene/hexafluoropropylene copolymer (FEP), tetrafluoroethylene/perchloroalkylvinylether copolymer (PFA), polychlorotrifluoroethylene (PCTFE), polyvinyldifluoride (PVDF), polypropylene resin, and polyvinylchloride resin.

These classes and examples of materials useful for the discriminating layer 28 are merely exemplary and should not be taken as limiting the scope of the present invention. Rather, they illustrate the variety of materials which can provide pore sizes within the useful range of about 0.5 nanometers to about 50 micrometers. (This is not to suggest that any one of these materials will by itself provide pore sizes throughout this entire range.) The particular material for the discriminating layer 28 should be compatible with the material of the body 11 and must of course be selected in view of the desired function of the discriminating layer 28.

Figure 5:
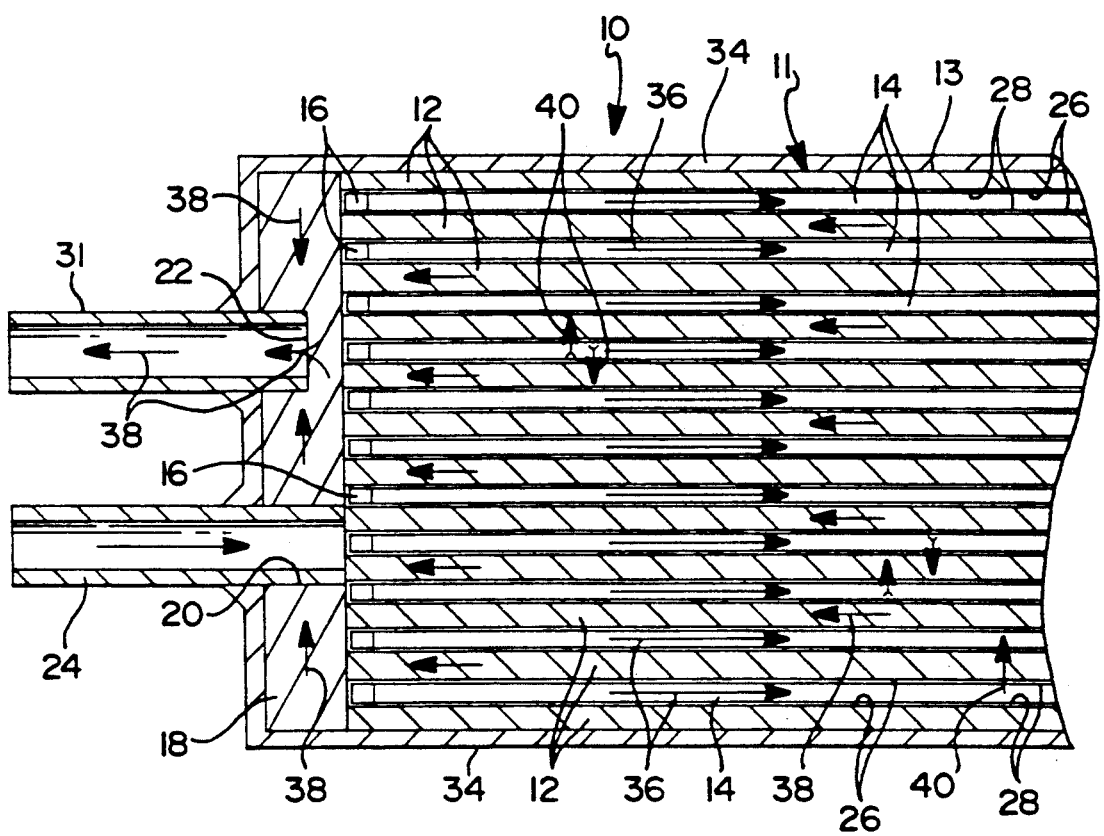
FIG. 5 is an enlarged, partial cross-sectional view of the cross-flow filter of FIG. 1, showing the flow of fluid through the open filter channels and through the porous support walls defining the open channels.

The use of the cross-flow filter 10 is straightforward, as shown in FIG. 5. A flow of the first fluid is established through the open channels 14 by supplying the first fluid through either of the first connecting tubes 24 and withdrawing it through the other. The flow of the first fluid is generally designated by the long arrows 36. A flow of the second fluid is established through the porous walls 12 and the porous end caps 18, preferably in a direction opposite to the flow of the first fluid, by supplying and withdrawing the second fluid through the second connecting tubes 30 and 31, respectively. The flow of the second fluid is generally designated by the short, tail-less arrows 38. The impermeable coating 34 collects and directs this flow of the second fluid.

The transfer of the contaminant or constituent across the membrane 26 is generally designated by the short, tailed arrows 40. (The desired contaminant or constituent can, of course, be filtered first fluid.) The flow of the constituent or contaminant is thereafter concurrent with the flow of the second fluid; that is, the constituent or contaminant passes through the porous walls 12 and the end caps 18, is collected and directed by the impermeable coating 34, and passes out of the body 11 through the second connecting tube 31. Of course, the designation of the second connecting tubes 30 and 31 is merely a matter of convenience. Indeed, for the saving of cost during assembly, it is preferred that the end caps 18, the first connecting tubes 24 and the second connecting tubes 30 and 31 are composed as identical units.

Use of the body 11 in other devices besides the cross-flow filter 10 described above is also straightforward. For example, the body 11 is useful in a heat exchanger for exchanging heat between two preferably opposed fluid flows. The construction of such a heat exchanger is identical to that of the cross-flow filter 10, except for the specific nature of the membrane 26. In a heat exchanger, it is critical that no exchange of fluids takes place; therefore, the membrane 26 of a heat exchanger must be an impermeable layer. Many such impermeable layers are known and would be useful in the practice of the present invention. However, because of the superiority of support offered by the single crystal acicular ceramic body 11 in both mechanical and thermal resistivity, an impermeable membrane 26 can be made thinner than past dividing walls or septa for heat exchanging. Indeed, it is expected that a broader range of impermeable materials will be useful in heat exchangers incorporating the body 11 of the present invention for this reason. Moreover, the high porosity of the body 11 permits a greater rate of fluid flow through it, specifically, through the porous walls 12. These factors allow a more rapid exchange of heat than could be obtained in prior heat exchangers.

The flow paths through a heat exchanger incorporating the body 11 would be essentially the same as those for the cross-flow filter 10 shown in FIG. 5, excepting, of course, that there would be no flow of material across the membrane 26. The small, tailed arrows 40 would instead represent the exchange of heat, in one direction or the other, depending upon which fluid was hotter.

The body 11 is also useful in a simple filter, presenting generally unimpeded flow of a fluid through the open channels 14, but having cross-flow of the filtrate. The construction of such a filter can be identical to that of the filter 10, except that the membrane 26 is only optionally applied to the porous walls 12. The flow path through the simple filter is essentially the same as that of the cross-flow filter 10, excepting, of course, that there is no second fluid. Filtrate from the flow of the first fluid passes through the walls 12 and end caps 18, is collected and directed by the impermeable coating 34, and exits the body 11 through either of the second connecting tubes 30 and 31.

The cross-flow filter 10 is preferably constructed as follows: a mixture containing alumina ($Al_2O_3$); and silica ($SiO_2$); in a molar ratio of about 2 to 1 (an atomic ratio of aluminum to silicon of about 4 to 1) is first prepared. The mixture can be prepared by combining clay and alumina, having a net composition of about 76 percent by weight alumina and 24 percent by weight silica, the clay and alumina being mixed according to the amount of alumina and silica in the clay. All of the following percentages, unless indicated otherwise, are also by weight. Suitable clays will typically contain about 35 percent silica and about 50 percent alumina, so that a typical starting composition prepared from alumina and clay can include about 60 percent clay and about 40 percent alumina. However, the mixture is advantageously and preferably prepared directly from alumina and fused (amorphous) silica powders of high purity. The mixture of alumina and clay or silica may be blended with a conventional filler for ceramics, such as wood flour or saw dust, and a convenient amount of water for handling. The filler provides porosity to the mixture upon conversion to acicular mullite, for example, by combustion of an organic filler, or by evolution of water from a hydrated form of alumina or silica The non-stoichiometric mullite will retain its overall dimensions and its theoretical density upon conversion to its acicular form.

The mixture of alumina, filler and either silica or clay is formed into any convenient or desired shape for the body 11. For example, a first portion of the mixture can be extruded in a honeycomb shape to yield the honeycomb extrusion 13. The remainder of the mixture can then be used to form the end caps 18 or any other pieces as may be included in the body 11.

The theoretical density of the body 11 will depend upon the volume percentage of filler employed in the mixture and the amount of pressure applied during the shape-forming process. Typically, a honeycomb extrusion can be made having sufficient green strength at 40 to 50 percent theoretical density. The inclusion of a greater volume percentage of filler allows other shapes to be obtained having theoretical densities as low as 15 percent, that is, having 85 percent porosity. The shape and theoretical density of the body 11 are selected to match the needs to which the filter 10 (or other device incorporating the body 11) will be put, and to match the function of the membrane 26.

Once extruded, the honeycomb extrusion 13 is allowed to dry to a self-sustaining green body. The open ends of all of the open channels 14 are then placed in fluid communication by the cutting of the saw cuts 16 across the whole of the open channel ends, in the diagonal directions shown by arrows A, B and C in FIG. 4.

The end caps 18 can be fastened to the honeycomb extrusion 13 either by moistening the end caps 18 with water, or by applying to the end caps 18 a diluted slurry of the same composition as the honeycomb extrusion 13, that is, having the same ratio of aluminum to silicon as in the extrusion 13. The honeycomb extrusion 13 and the end caps 18 are then oriented vertically, and converted to acicular, non-stoichiometric mullite simultaneously. The connecting tubes 24, 30 and 31 can be inserted in the end cap holes 20 and recesses 22 and co-fired with the extrusion 13 and the end caps 18. Alternatively, the connecting tubes 24, 30 and 31 can be previously formed or fired. In either case, conversion of the end caps 18 desirably affixes the connecting tubes 24, 30 and 31 to the end caps 18.

Preferably, the conversion of the honeycomb extrusion 13 and the end caps 18 is carried out in such a fashion so that the extrusion 13 and the end caps 18 retain the same theoretical density or porosity as they possessed in their green state. It is particularly preferred that the conversion process be carried out in accordance with the process disclosed in our copending application Ser, No. 07/633,579, filed Dec. 21, 1990, and assigned to the assignee of the present application. The preferred conversion process is described in general terms at page 5, line 4, through page 7, line 5, of that application; and in detail at page 7, line 7, through page 15, line 21, of that application. That application is expressly incorporated by reference herein.

In general, the preferred conversion process is a two step process in which alumina and silica in a molar ratio of about 2 to 1 are heated in a closed system at 500° to 950° C. in the presence of $SiF_4$. The alumina, silica and $SiF_4$ are heated a sufficient time to react and form fluorotopaz. The resulting fluorotopaz is then heated to about 975° to 1150° C. The fluorotopaz transforms to non-stoichiometric mullite whiskers, with the evolution of all of the $SiF_4$ previously absorbed. If necessary, the temperature can be cycled between these two ranges until $SiF_4$ is no longer absorbed by the material upon cooling down to the lower temperature range, indicating that no unreacted alumina and silica remains in the mixture. Not only does this process convert the honeycomb extrusion 13 and the end caps 18 to non-stoichiometric acicular mullite, the whiskers forming them unexpectedly fuse and become interlocked in a three dimensional fashion, so as to fix the end caps 18 steadfastly to the honeycomb extrusion 13. The resulting body 11 is thus composed of a plurality of pieces which are extremely resistant to separation, since they are structurally uniform with and interlocked with each other, even through the locations at which the pieces abut.

Once converted to acicular mullite, the exterior of at least the honeycomb extrusion 13 and the end caps 18 are coated with the coating 34, preferably any conventional, compatible glaze, and fired. The glaze forms a nonreactive, fluid-impermeable surface over the extrusion 13 and the end caps 18. In order to assure a good seal with the connecting tubes 24, 30 and 31, the glaze can extend partway along them, so long as their ends are left open.

The preferred glaze is a mixture of glass frit and clay. One particularly preferred high temperature, commercial glaze for this purpose is sold under the trademark "PEMCO" glaze by Mobay Chemical Company. Of course, depending upon the service temperature intended for the cross-flow filter 10, the exterior of the honeycomb 13 and the end caps 18 can alternatively be rendered impermeable by any one of a number of other conventional techniques.

The alpha-alumina membrane or other discriminating layer 28 is then applied to the surfaces of the porous walls 12 defining the plurality of open channels 14 of the filter 10. The layer 28 can be applied in any fashion conventional for the application of discriminating layers. Essentially any conventional coating is useful as the layer 28, so long as it possesses a pore size less than the pore size of the honeycomb extrusion 13. Many hydrocarbon polymers, fluorocarbon polymers and ceramics are known to be useful in this regard. It is particularly preferred, however, that alpha-alumina be used for this purpose. For example, when an alpha-alumina membrane is used in the present invention to separate insoluble organics from an aqueous slurry, the organics trapped on the membrane can advantageously be ignited and burned from it, thereby regenerating the filter 10.

The discriminating layer 28 to be applied onto the support may include a sintered ceramic layer, such as an alpha-alumina membrane having a pore size between about 0.15 and 50 micrometers, useful for a microfilter. If an ultrafilter is desired, smaller pore sizes may be made as described hereinbelow. Such an alpha-alumina discriminating membrane may be applied as follows: A slurry of the alpha-alumina in water is first prepared, typically containing 50 percent or more water. As is conventional, the slurry can also include a dispersant in order to prevent agglomeration of the alpha-alumina powder in the slurry. The slurry can include an acid or base in order to adjust the pH of the slurry and improve dispersion of the alpha-alumina in the slurry. The slurry can also include an agent for controlling the viscosity of the slurry, such as "METHOCEL" (a registered trademark of Dow Chemical Company, Midland, Mich., for its brand of methylcellulose).

The powdered alpha-alumina used for preparation of the membrane is preferably of a high grade of purity, since impurities in the powder will affect the range of sizes and uniformity of sizes of the pores achieved in the membrane. Alcoa Aluminum Corporation and Vista Corporation each sell alpha-alumina powders of near 100 percent purity useful in the present invention. Typical useful grades of Alcoa alpha-alumina are grades A-13, A-16, and A-99. Alcoa grade A-99 powders range in size from about 0.15 to about 1.0 micrometers in diameter, with an average diameter of 0.2 micrometers. Grade A-16 ranges from about 0.2 to about 10 micrometers in size, with an average diameter of about 0.4 micrometers. Grade A-13 ranges in size from about 1 to about 50 micrometers, with a mean diameter between 5 and 10 micrometers. Mixtures of various particle sizes can also be employed in the present invention, to yield any desired pore size in the ceramic membrane.

Once the slurry of the powdered alpha-alumina is prepared, it is introduced into the cross-flow filter 10 through one of the first connecting tubes 24 and allowed to coat the surfaces of the open channels 14 and any exposed surfaces of the end caps 18. Excess slurry is then removed from the filter 10, and the filter 10 then sintered in order to form a thin, continuous layer of microporous alpha-alumina atop the non-stoichiometric acicular mullite body 11.

In the event that an ultrafilter is desired, a similar procedure is followed, although a slurry of finer particles is used. This will result in a pore size of somewhat greater than about 0.5 nanometers. The discriminating layer may also be graded from the highly porous body 11 through an intermediate discriminating layer of microporous material and topped with a layer of ultra-fine porous material, in order to effect more efficient ultrafiltration.

If a heat exchanger is desired, the membrane 26 is not porous, but (as indicated above) is instead impermeable to the fluids being treated. Any of a variety of materials can be used as an impermeable membrane 26, for example, the same glaze used for the external impermeable coating 36 on the body 11, or a fired ceramic or other layer. It is preferred that the impermeable membrane be as thin as possible, subject to the strength required of it during use. Some of the criteria to be considered in assessing the necessary thickness and character of an impermeable membrane include, but are not limited to: high thermal conductivity; low difference in thermal expansivity from that of the porous body 11; resistance to deformation under the pressure of the fluids to which it is exposed; resistance to corrosion at the intended temperature of use; and other conventional considerations for constructing heat exchangers. The selection of any particular material and any particular thickness for an impermeable membrane 26 for use in the present invention would be well within the skill of those in the art, without undue experimentation, in view of the present disclosure.

The firing schedules and optimal temperatures for conversion of the preferred non-stoichiometric mixture of alumina and silica or clay to acicular mullite in the body 11 and the end caps 18 are subject to ready determination without undue experimentation. However, for the preferred mullite, alpha-alumina and glaze compositions disclosed, the following heating schedule is convenient:

1. Filler burn-out and bisque firing. A bisque composed of the assembled green honeycomb extrusion 13 and end caps 18 is heated at 3° C. per minute from room temperature up to 350° C., then at 5° C. per minute up to 650° C., and held at that temperature for 60 minutes. The assembly is then heated to 1100° C. at 5° C. per minute, and finally allowed to cool to room temperature at 20° C. per minute.

2. Conversion to acicular mullite. The assembled pieces are reheated in nitrogen at a rate of 10° C. per minute from room temperature up to 950° C., preferably up to about 750° C. The pieces are then subjected to vacuum, and exposed to a $SiF_4$ atmosphere over a period of 60 minutes. The assembly is then heated at 20° C. per minute up to 1100° C. for 60 minutes while $SiF_4$ is removed, for example, by sublimation into another furnace at 750° C. As indicated earlier, the assembly may be allowed to cycle between these two temperatures until conversion is completed, as indicated by a lack of uptake of $SiF_4$ at the lower temperature. Nitrogen is then admitted, and the assembly allowed to cool to room temperature at 25° C. per minute.

3. Creation of external glaze. Glazing is carried out by heating the assembly and the applied glaze to 1000° C. at a rate of 10° C. per minute. The assembly is held at 1000° C. for 15 minutes and then cooled to room temperature at the rate of 25° C. per minute.

4. Sintering of alpha-alumina membrane.

After application of the alumina slurry to the surfaces defining the open channels 14, the filter 10 is heated at rate of about 5° C. per minute from room temperature to 1550° C. The filter 10 is then held at 1550° C. for about 2 hours, and allowed to cool to room temperature at 10° C. per minute.

Again, since the characteristics of the non-stoichiometric acicular mullite ultimately obtained as a support body 11 for the discriminating layer 28 depend upon the conditions under which formation of the intermediate fluorotopaz and its decomposition are carried out, the process steps should be optimized for the particular characteristics desired. However, since the formation and decomposition of the intermediate fluorotopaz are carried out as separate steps, it is a significant advantage of the present invention that these can be optimized independently.

The present invention possesses numerous other advantages. Suitable characteristics for the acicular mullite or other fused interlocked single crystal acicular ceramic body 11 can be chosen as appropriate for the membrane to be supported or the fluid to be filtered or treated. For example, the individual whiskers making up the acicular non-stoichiometric mullite will typically have diameters ranging from 0.05 to 2 micrometers, aspect ratios of about 10 to about 50, and lengths of 4 to 30 micrometers. However, one advantage of the preferred process for carrying out the conversion as disclosed in our earlier application is that significantly larger whiskers can be obtained, having diameters ranging up to 30 to 50 micrometers, with similar aspect ratios. The interlocked whiskers are bound to each other where they cross, so that a very strong three-dimensional network of very high porosity is achieved over a wide range of support pore sizes.

While there has been some prior use of acicular particles as catalysts or catalytic supports, the prior acicular particles were substantially smaller needles than those achieved in this process, and thus provided a significantly smaller pore size than that enjoyed by the body 11 in the present invention. The larger pore sizes allow devices incorporating the present invention to achieve very high flow rates through the porous body 11. This advantage is especially important in heat exchangers.

The present invention enjoys other types of advantages over the prior art. For example, one drawback in the use of conventional polymers on conventional alumina or cordierite supports has been that the polymers and supports tend to flatten under pressure during use, and become less permeable over time. A loss of permeability is evidenced by a decrease in the flow rate through the filter over time, and suggests that the pores close over time. The superior mechanical strength, impact strength and thermal resistivity of non-stoichiometric acicular mullite or another fused single crystal acicular ceramic as a support obviates these problems, and allows membranes to retain high permeability over a long period of use at elevated service temperatures. Because the whiskers are bound together where they cross (unlike prior fiber mats, felts or meshes), the network of mullite whiskers of the present invention does not collapse with time.

Yet another drawback of the prior art filters was that their filter support materials were relatively impermeable when compared to the membrane layers on them. Therefore, because the prior art filter supports were so dense compared to their discriminating layers, the filter supports themselves were the rate-limiting factor for filtration through them. The ceramic filter supports of the prior art devices were typically on the order of about 70% dense (i.e. 30% porous), making the permeable of the supports quite low. In contrast, the body 11 of the present invention enjoys a high permeability, due to the theoretical density of from about 15 to about 50 percent. Moreover, because the discriminating layer 28 on top of the body 11 is preferably is denser than the body 11, the rate-limiting factor is the discriminating layer 28, rather than the body 11. Thus, due to the high porosity of the body 11 in the present invention (in accordance with its low density), a better filter is achieved for certain applications.

Perhaps the most significant advantage enjoyed by the present invention, however, is the very economical manner in which ceramic bodies of a variety of complex shapes can be assembled. Prior methods for assembling ceramic filters and devices have generally required some sort of subsequent sintering or bonding step after the ceramic support has been put into acicular form, in order to lend mechanical and impact strength to the filter incorporating it. Because the present invention entails the in situ conversion of a green non-stoichiometric mullite or other ceramic material into a fused single crystal acicular form, the previously required bonding step is eliminated. This in situ conversion also permits complex or multi-piece shapes to be fully constructed in a green state, rather than from separately fired pieces as previously required, because of the interlocking and fusing of the ceramic single crystals. The invention thus avoids the costs and risks encountered in prior methods involving the affixment together of pre-fired ceramic pieces, such as the time and cost of joining and refiring the pieces, the risk of breaking one or more of the pieces during such manipulations, and the risk of fracture or separation of the refired pieces from inadequate bonding of the pieces to the material filling the joints between them.

This advantage is particularly enjoyed when the body 11 is employed to support an impermeable membrane 26 in a heat exchanger. Prior heat exchangers have often suffered the drawback of fracture at the locations where their constituent pieces of differing composition (for example, metal and ceramic) join one another. It has been difficult if not impossible to select a material capable of both joining and sealing the different pieces, because of their differences in thermal expansivity. Construction of an entire heat exchanger from the same ceramic without a different joining and/or sealing material, as disclosed herein, obviates this previously encountered disadvantage.

Many modifications to the disclosed filter 10 can be made while retaining the advantages enjoyed by the use of a non-stoichiometric acicular mullite or other fused single crystal acicular ceramic body as a membrane support. The body 11 disclosed herein is only one example of the variety of shapes a device according to the present invention can take. The body 11 can be formed by any fabrication process and any mixture of constituents which upon in situ conversion yields the preferred non-stoichiometric acicular mullite having a molar ratio of alumina to silica of about 2 to 1, or which yields a ceramic support having structural characteristics comparable to a fused, interlocked, single crystal acicular ceramic material. For example, for converting non-stoichiometric mullite to acicular form, the source of fluorine can be different from $SiF_4$, and materials such as $AlF_3$, HF, $Na_2SiF_6$, NaF, and $NH_4F$ are also expected to be useful for this purpose. Examples of prior uses of some of these sources of fluorine are disclosed in Derwent Publication 84-264450/43 ($AlF_3$ and HF); Chemical Abstracts Volume 70, 1969, 9035q, Hanus Landspersky (discussing probable mechanisms of mullite formation with several fluorides); Chemical Abstracts Volume 99, 1983, 99:132640n, Abdel Rehim ($NH_4F$); Chemical Abstracts Volume 70, 1969, 31332j (NaF); Chemical Abstracts Volume 94, 1981, 94;144160r, Sang-Wook Choi et al. ($Na,SiF_6$); and Derwent Publication 90307R-L ($SbF_3$, $NH_4F$, HF, $Na_2SiF_6$, LiF, $AlF_3$, and $BaF_2 \cdot 3\frac{1}{2}H_2O$).

The membrane 26 can be formed by any fabrication process and any constituents which yield a layer useful for its intended purpose. For example, U.S. Pat. No. 4,874,516 discloses a method for applying a PTFE membrane filter to a ceramic substrate so as to substrate and PTFE are heat-treated to yield a supported membrane of a high polymer resinous material having a useful pore size as small as about 0.1 micrometer, for ultra- or semiultrafiltration. Appropriate fabrication processes for membranes of other materials are well known, and can be adapted for use in the present invention without undue experimentation.

Thus, in accordance with the present invention there is provided a single or dual fluid cross-flow filter or heat exchanger which achieves numerous advantages because of the high permeability, high mechanical and impact strength, and high thermal resistivity enjoyed by non-stoichiometric acicular mullite and other fused single crystal acicular ceramics. These simultaneous characteristics make the present invention useful in a wide variety of environments over an improved range of service temperatures.

While our invention has been described in terms of several specific embodiments, it must be appreciated that other embodiments could readily be adapted by one skilled in the art. Accordingly, the scope of our invention is to be limited only by the following claims.

What is claimed is:

1. A structure for filtering a fluid or for exchanging a constituent between two fluids, comprising means for providing cross-flow including:
    a body composed of a fused, interlocked, single crystal acicular ceramic material, said body having porous partition walls defining at least one open channel extending entirely through said body; and
    means for collecting fluid exiting said body through said partition walls.

2. The structure of claim 1, wherein said means for collecting exiting fluid includes an impermeable coating substantially covering the exterior of said body.

3. The structure of claim 2, wherein said coating is a glaze.

4. The structure of claim further comprising a membrane disposed on said porous partition walls, thereby lining said at least one open channel.

5. The structure of claim 4, wherein said membrane is a porous discriminating layer.

6. The structure of claim 5, wherein said discriminating layer is a sintered ceramic layer, a layer of a polymeric organic compound, a molecular sieve, a gel filtration layer, or a microporous gaseous diffusion barrier.

7. The structure of claim 5, wherein said discriminating layer is a sintered alpha-alumina membrane.

8. The structure of claim wherein said body includes a honeycomb extrusion having a plurality of parallel open channels defined by said partition walls.

9. The structure of claim 8, wherein all of said plurality of parallel channels fluidly communicate with one another.

10. The structure of claim 1, wherein said body includes a pair of porous end caps, composed of said acicular ceramic material and abutting said partition walls, each of said end caps having a hole therethrough in fluid communication with said at least one channel.

11. The structure of claim 10, wherein said end caps are interlocked with said partition walls.

12. The structure of claim 10, further comprising a pair of connecting tubes received in said holes in said end caps.

13. The structure of claim 10, wherein said end caps each include a recess opposite said partition walls extending only partway through said end caps, and wherein said structure further comprises a pair of connecting tubes received in said recesses in said end caps.

14. The structure of claim 1, wherein said ceramic material is non-stoichiometric acicular mullite.

15. The structure of claim 1, wherein said means for collecting exiting fluid is formed integrally with said body.

* * * * *

UNITED STATES PATENT AND TRADEMARK OFFICE
CERTIFICATE OF CORRECTION

PATENT NO. : 5,194,154

DATED : March 16, 1993

INVENTOR(S) : John R. Moyer and Neal N. Hughes

It is certified that error appears in the above-identified patent and that said Letters Patent is hereby corrected as shown below:

Title page, item [57] Abstract:

In the abstract after " and exits the porous walls." Please insert -- When the structure is used in a cross-flow filter for a single fluid, a flow of the fluid is directed through the open channel(s), and the desired filtrate passes into and through the porous walls, and is collected by the collecting portion. A discriminating layer such as a semi-permeable membrane may be disposed on the partition walls, so as to line the open body channel(s), when the structure is used in a cross-flow filter for transferring a constituent or contaminant between two fluids. Alternatively, when the structure is used in a heat exchanger, a thin, impermeable membrane is instead disposed on the partition walls, so as to line the open channel(s). The structure allows higher fluid flow rates than obtained with prior devices--.

In the claims:

Col. 16, line 52, "or for exchanging a constituent" should correctly read --or for exchanging heat or a constituent--.

Col. 16, line 66, "structure of claim further" should correctly read --structure of claim 1 further--.

Signed and Sealed this

Seventeenth Day of May, 1994

*Attest:*

BRUCE LEHMAN

*Attesting Officer*     *Commissioner of Patents and Trademarks*